May 2, 1933. R. E. RISSER 1,907,005
BARREL TRUCK
Filed Nov. 22, 1929
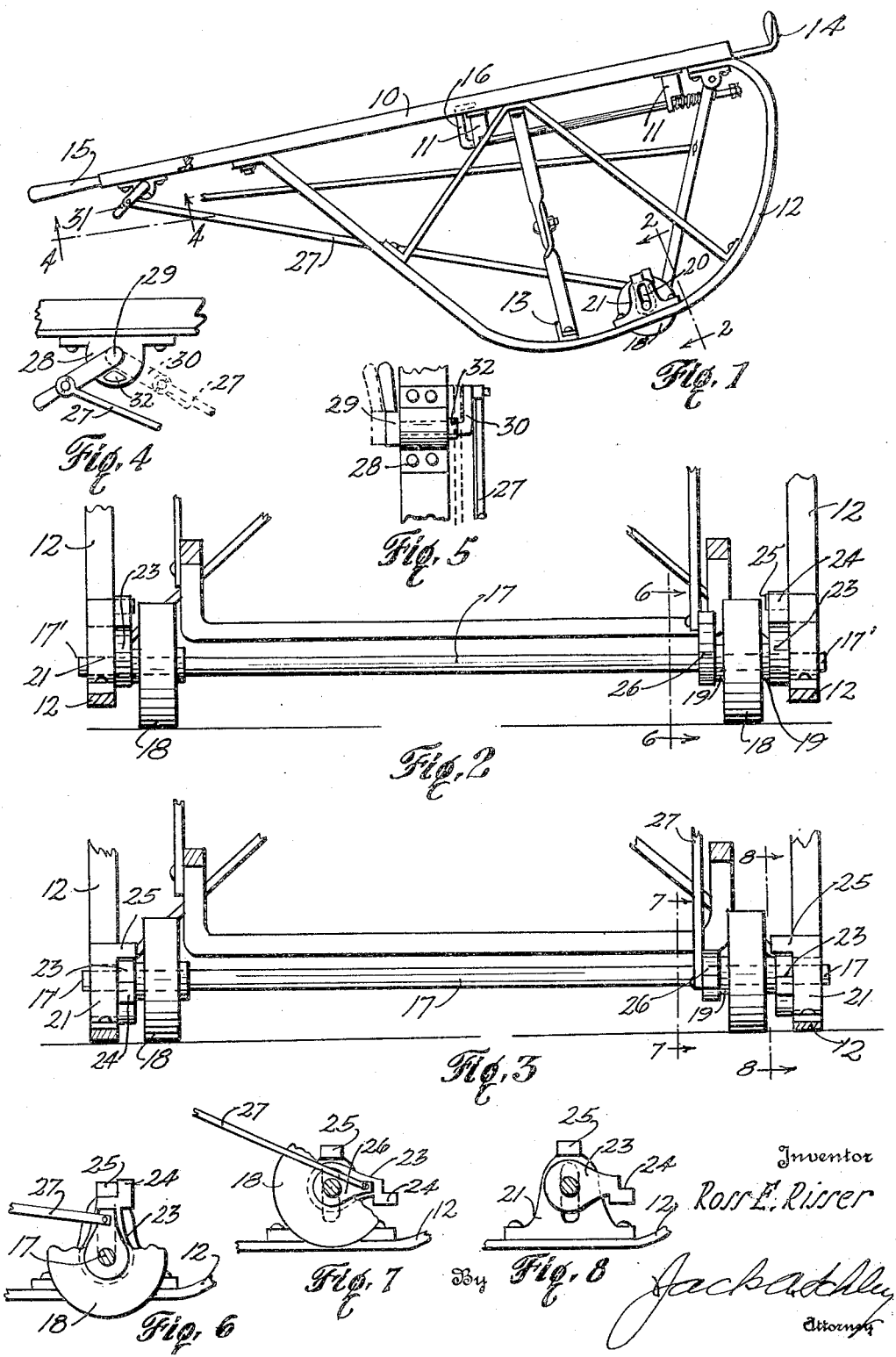

Patented May 2, 1933

1,907,005

UNITED STATES PATENT OFFICE

ROSS E. RISSER, OF BONHAM, TEXAS, ASSIGNOR TO SOUTHWEST PUMP COMPANY, OF BONHAM, TEXAS, A CORPORATION OF TEXAS

BARREL TRUCK

Application filed November 22, 1929. Serial No. 408,983.

This invention relates to new and useful improvements in barrel trucks.

One object of the invention is to provide an improved barrel truck, particularly designed for transporting barrels and drums, as well as supporting the same in a horizontal position.

A particular object of the invention is to provide means for locking and releasing the truck wheels, whereby the wheels may move upwardly when the truck is rocked from one position to another position, thus permitting the rocking action to be carried out entirely on the rockers and preventing the wheels from rolling the truck forwardly or rearwardly when it is being rocked.

A further object of the invention is to provide readily operated means operating the locking and releasing means, whereby the wheels may be locked below the rockers in operative position or released so as to be free to move upwardly and permit the truck to rest upon its rockers.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a side elevation of a truck constructed in accordance with the invention and in a horizontal position, Figure 2 is an enlarged transverse sectional view taken on the line 2—2 of Figure 1, Figure 3 is a similar view showing the wheels in inoperative position, Figures 4 and 5 are details of the actuating means for the wheel locking and releasing elements.

Figure 6 is a cross-sectional view taken on the line 6—6 of Figure 2,

Figure 7 is a cross-sectional view taken on the line 7—7 of Figure 3, and

Figure 8 is a cross-sectional view taken on the line 8—8 of Figure 3.

In the drawing the numeral 10 designates a pair of longitudinal side bars which are connected by arched cross straps 11 intermediate their ends. These cross straps provide a bed for the support of a barrel or the like (not shown). Rockers or fulcrums 12 are secured at their forward and rear ends to the undersides of the side bars and are connected by a cross brace 13. A foot 14 is provided at one end of each side bar and a handle 15 is provided at the opposite end.

A spring pressed hook 16 is carried by the cross bars 11, as is shown in Figure 1. When it is desired to load a barrel on the truck it is swung on its rockers 12 to an upright position so that the feet 14 rest upon the floor. The truck is then moved forwardly so as to slip the feet under the lower chine of the barrel. Then by engaging the hook 16 over the upper chine the truck and barrel are fastened together. The operator then rocks the truck on its rockers 12 to a horizontal position.

In order to prevent the wheels 18 from interfering with the rocking of the rockers 12, said wheels are rotatably confined on an axle 17 between collars 19. The axles extend outwardly beyond the wheels to form trunnions 17′ and these latter engage in vertical slots 20 in blocks or keepers 21 fastened on the upper sides of the runners. By this arrangement the wheels are allowed a limited upward movement and when the rockers are swung said wheels will be displaced upwardly, as is shown in Figures 3 and 7, so as not to interfere with their rocking operation. When the truck is elevated to the position shown in Figure 1 the wheels drop below the rockers.

In order to fasten the wheels in operative position, as is shown in Figures 1, 3 and 6, arms 23 are fastened on the trunnions 17 contiguous to the inner side of the blocks 21. Each arm has a step 24 at its upper end and by rotating the axle so as to swing the step under a lug 25 projecting from the box, the axle will be locked in its lower position with the trunnions 17′ at the bottom of their slots, as is shown in Figures 2 and 6.

For swinging the axle a crank arm 26 is fastened to said axle adjacent one of the collars 19 and has pivotal connection with one end of a pitman 27. A box 28, as is best shown in Figures 4 and 5, has a crank 29 extending therethrough and this crank has a limited play so as to be slid transversely in the box. The pitman 27 is attached to the arm 30 of the crank so as to be swung thereby. A handle 31 is provided on the opposite end of the crank adjacent the handle 15. A boss 32 is provided on one side of the box 28 in the path of the arm 30. When it is desired to swing the crank, it is shifted transversely to the position shown in dotted lines in Figure 5 so that the arm may swing clear of the boss. By shifting the crank in a reverse direction the arm may be locked on either side of said boss.

When it is desired to lock the wheel in operative position, as is shown in Figures 1, 2 and 6, the handle 31 is pulled rearwardly to lock the arm in the position shown in full lines in Figure 4, whereby the crank arm 26 is swung from the position shown in Figure 7 to the position shown in Figure 6, which rotates the shaft and swings the arms 23 likewise. The slots 20 are given sufficient length to permit the steps 24 to freely ride under the lugs 25 and thus when the rockers are lowered the trunnions 17' will move upwardly in the slots 20 so as to firmly engage the steps and the lugs.

When it is desired to release the wheels the handle 31 is swung forwardly and the arm 30 engaged over the boss 32, as is shown in dotted lines in Figure 4. This swings the arm 26 to the position shown in Figure 7, whereby the arms 23 are swung to the position shown in Figure 8. The wheels and trunnions are then free to move upwardly when the rockers are swung.

Various changes in the size and shape of the different parts, as well as modifications and alterations, may be made within the scope of the appended claims.

What I claim, is:

1. In a barrel truck, a barrel support including rockers and handles, boxes mounted on the rockers, an axle having its ends movable vertically in said boxes, lugs carried by the boxes, locking arms on the axle having steps for engaging the lugs, an operating crank on the support adjacent one of the handles, an arm on the axle, and a connection between the arm and the crank for swinging said arm to rotate the axle.

2. In a barrel truck, a barrel support including curved rocker bars and handles, boxes mounted on the bottoms of said bars having slots, an axle movable in the slots of the boxes, fastening devices carried by the axle, projections on the boxes in the paths of the fastening devices, wheels mounted on the axle, means for rocking the axle to engage the fastening devices with the projections, whereby the wheels are adjusted with relation to the rocker bars, and means extending from one of the handles and connected with the rocking means for actuating the latter.

3. A barrel support including, longitudinal side bars having handles at their ends at one end of the support, curved rockers secured to the bars, the handles being spaced rearwardly of the rockers, an axle extending between the rockers, wheels mounted on the axle, supports on the rockers in which the axle is free to move, means mounted on the axle for engaging the supports to hold the wheels below the rockers, means for moving the axle to engage and disengage said means, and a lever on one of the side bars adjacent the handle connected with the last named means for actuating the same.

In testimony whereof I affix my signature.

ROSS E. RISSER.